US012346563B2

(12) United States Patent
Kingsley

(10) Patent No.: US 12,346,563 B2
(45) Date of Patent: Jul. 1, 2025

(54) CODE POINT SKIPPING WITH VARIABLE-WIDTH ENCODING FOR DATA ANALYTICS SYSTEM

(71) Applicant: Alteryx, Inc., Irvine, CA (US)

(72) Inventor: Christopher H. Kingsley, Longmont, CO (US)

(73) Assignee: Alteryx, Inc., Irvine, CA (US)

( * ) Notice: Subject to any disclaimer, the term of this patent is extended or adjusted under 35 U.S.C. 154(b) by 0 days.

(21) Appl. No.: 18/501,821

(22) Filed: Nov. 3, 2023

(65) Prior Publication Data

US 2025/0147661 A1 May 8, 2025

(51) Int. Cl.
*G06F 16/14* (2019.01)
*G06F 3/06* (2006.01)

(52) U.S. Cl.
CPC .......... *G06F 3/0608* (2013.01); *G06F 3/0655* (2013.01); *G06F 3/0673* (2013.01); *G06F 16/148* (2019.01)

(58) Field of Classification Search
CPC .... G06F 16/148; G06F 3/0608; G06F 3/0655; G06F 3/0673
See application file for complete search history.

(56) References Cited

U.S. PATENT DOCUMENTS 5,634,123 A * 5/1997 Bennion ............... G06F 12/023
6,173,330 B1 * 1/2001 Guo ................... H04N 21/2362 348/E7.071
7,139,837 B1 * 11/2006 Parekh .................... H04L 45/48 709/239
7,787,481 B1 * 8/2010 Liang ..................... G06Q 10/10 710/53
2003/0212696 A1 * 11/2003 Davis ...................... H03M 7/30
2013/0275403 A1 * 10/2013 Liu .................. G06F 16/24547 707/706
2016/0188496 A1 * 6/2016 Gschwind ............ G06F 12/121 711/159

(Continued)

OTHER PUBLICATIONS

"Skipping ahead n codepoints while iterating through a unicode string in Go", Stack Overflow, https://stackoverflow.com/questions/23179824/skipping-ahead-n-codepoints-while-iterating-through-a-unicode-string-in-go?rq=4, Apr. 20, 2014, 2 pp. (Year: 2014).*

(Continued)

*Primary Examiner* — Marc S Somers
(74) *Attorney, Agent, or Firm* — FIG. 1 Patents

(57) ABSTRACT

A computer system performs a code point skipping method for skipping a desired number of code points. The computer system accesses a data file stored in memory of a computing device. The data file may include a series of characters corresponding to a series of code points. The code points of the data file may be encoded in memory using a variable-width encoding scheme, and a code point corresponds to one or more encoded bytes in memory. The computer system creates a pointer pointing to a location in the memory for the data file. The computer system receives a request to skip ahead a particular number of code points in the data file to a desired location. The computer system determines a number of lead bytes in a multi-byte sequence to determine a number of code points to skip and repeats this process for the next multi-byte sequence.

20 Claims, 9 Drawing Sheets

(56) References Cited

U.S. PATENT DOCUMENTS

2022/0188028 A1* 6/2022 Mesnier .................. G06F 3/067

OTHER PUBLICATIONS

"Why does UTF-8 waste several bits in its encoding", Software Engineering, https://softwareengineering.stackexchange.com/questions/262227/why-does-utf-8-waste-several-bits-in-its-encoding, Nov. 9, 2014, 5 pp. (Year: 2014).*

Wikipedia, Data structure alignment, https://web.archive.org/web/20190209093652/https://en.wikipedia.org/wiki/Data_structure_alignment, Feb. 9, 2019, 9 pp. (Year: 2019).*

* cited by examiner

```
I          [space]    s          a          i          d          Д

01001001:00100000:01110011:01100001:01101001:01100100:11010000:10010100 (original)

00100100:10010000:00111001:10110000:10110100:10110010:01101000:01001010 (shift right by one)

11011011:01101111:11000110:01001111:01001011:01001101:10010111:10110101 (complement shift)
-----------------------------------------------------------------------

11011011:01101111:11110111:01101111:01101011:01101101:11010111:10110101 (OR with original)

01000000:01000000:01000000:01000000:01000000:01000000:01000000:01000000 (0x40)
-----------------------------------------------------------------------

01000000:01000000:01000000:01000000:01000000:01000000:01000000:00000000 (AND with 0x40)
```

FIG. 5

```
I         [space]   s         a         i         d         Д

01001001:00100000:01110011:01100001:01101001:01100100:11010000:10010100 (original)

00100100:10010000:00111001:10110000:10110100:10110010:01101000:01001010 (shift right by one)
------------------------------------------------------------------------

01101101:10110000:01111011:11110001:11111101:11110110:11111000:11011110 (OR = SeekNull)

00011011:01101100:00011110:11111100:01111111:01111101:10111110:00110111 (shift right by two)
------------------------------------------------------------------------

01011011:01101100:01011110:11111100:01111111:01111101:11111110:01110111 (OR = SeekNull)

00000101:10110110:11000101:11101111:11000111:11110111:11011111:11100111 (shift right by four)
------------------------------------------------------------------------

01011111:11111110:11011111:11111111:11111111:11111111:11111111:11110111 (OR = SeekNull)

00000001:00000001:00000001:00000001:00000001:00000001:00000001:00000001 (0x01)
------------------------------------------------------------------------

00000001:00000001:00000001:00000001:00000001:00000001:00000001:00000001 (AND with 0x01)
```

FIG. 6

CODE POINT SKIPPING WITH VARIABLE-WIDTH ENCODING FOR DATA ANALYTICS SYSTEM

BACKGROUND

Field of Art

The described embodiments pertain in general to processing data for data analytics purposes, and in particular to processing code points encoded based on a variable-width encoding scheme in analytics data.

Description of the Related Art

Data analytics involves extracting information having business value from large data sets. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). Processing such large data sets, as used in data analytics, in a manner that extracts useful quantitative and qualitative information typically requires complex software tools implemented on powerful computing platforms.

The content of a data file can include a series of characters that are stored in memory by encoding characters using a variable-width encoding scheme. For example, a variable-width encoding scheme is UTF-8 that encodes Unicode characters using one, two, three, or four bytes. Often times, for a given data file, users of a data analytics system desire to skip ahead certain number of code points in the data file when reading and processing the data file using a pointer. However, while it is easy to move ahead a certain number of bytes in memory, it is a more difficult problem to move ahead a certain number of code points, as each code point may be encoded using variable-widths, and therefore, the number of bytes encoding each code point is not fixed.

SUMMARY

The above and other issues are addressed by a method, computer-implemented data analytics system, and computer-readable memory for skipping a desired number of code points. An embodiment of the method includes accessing a data file stored in memory of a client device. The data file may represent a series of characters corresponding to a series of code points. The code points of the data file may be encoded in memory using a variable-width encoding scheme, and a code point corresponds to one or more encoded bytes in memory. The method also includes creating a pointer pointing to a location in the memory for the data file. The method also includes receiving a request to skip ahead a particular number of code points in the data file to a desired location.

The method also includes for each iteration in one or more iterations, loading a chunk of memory into a register for a current iteration. The chunk may include a multi-byte sequence in memory starting from the location of the pointer. The method also includes generating a complemented shifted sequence by performing a right shift operation to the multi-byte sequence and complementing bits of the shifted sequence. The method also includes performing an OR operation between the multi-byte sequence and the complemented shifted sequence and generating an output sequence by performing an AND operation between the sequence that is a result of the OR operation and a comparison sequence. The method also includes determining a number of lead bytes in the current multi-byte sequence by performing a count operation to count a number of one-bits in the output sequence. The method also includes moving the pointer ahead by a number of bytes in the current multi-byte sequence to a next location that is a location for the next iteration. In response to a determination that a number of code points to skip is equal to or less than a predetermined threshold, the method also includes processing one or more individual bytes from memory to move the pointer to a location for a destination code point that comes after the reference code point by the desired number of code point skips.

BRIEF DESCRIPTION OF DRAWINGS

FIG. 5 is an example illustrating a method of processing a multi-byte chunk of the data file to determine a number of lead byes, according to one embodiment.

FIG. 6 is an example illustrating a method of processing a multi-byte chunk of the data file to determine the presence of NULL bytes in the sequence, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
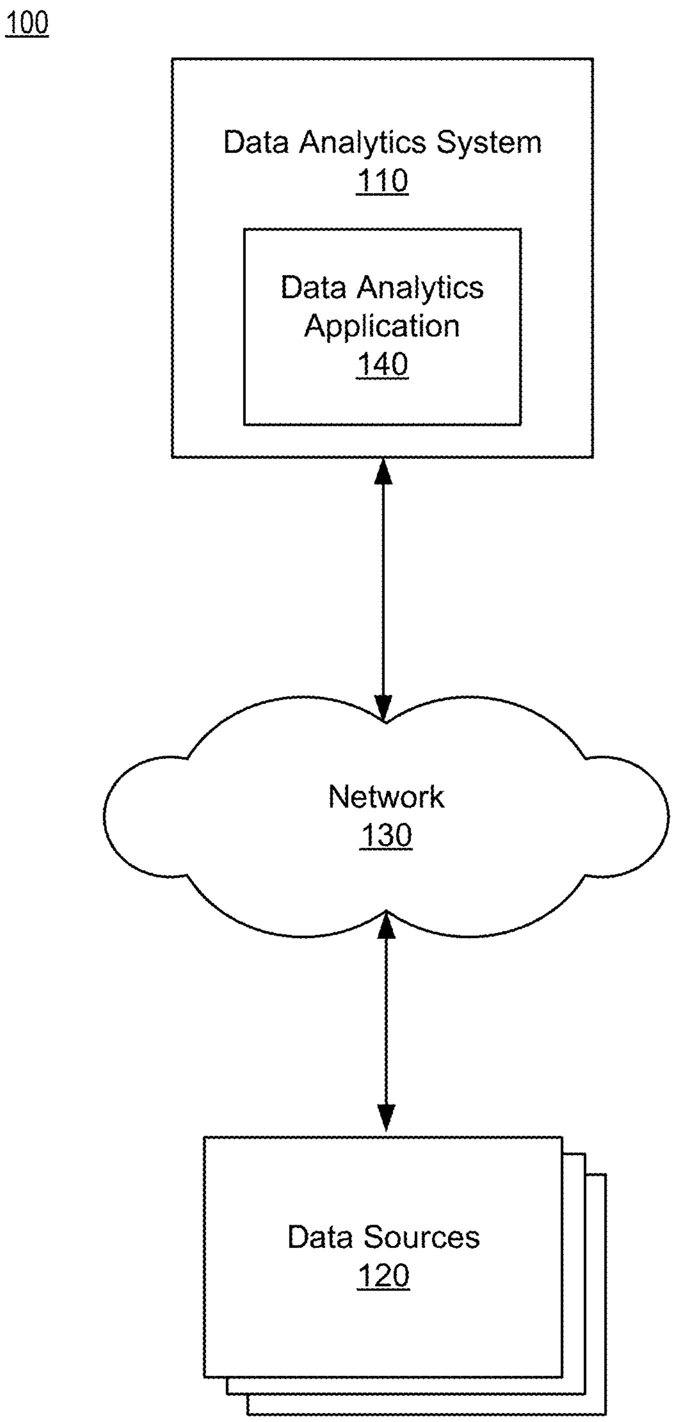
FIG. 1 is a block diagram illustrating a data analytics environment including a data analytics system, according to one embodiment.

FIG. 1 is a block diagram illustrating a data analytics environment 100 including a data analytics system 110 according to one embodiment. The environment 100 further includes multiple data sources 120 connected to the data analytics system 110 via a network 130. Although the illustrated environment 100 contains only one data analytics system 110 coupled to multiple data sources 120, embodiments can have multiple data analytics systems and a singular data source.

The data sources 120 provide electronic data to the data analytics system 110. A data source 120 may be a storage device such as a hard disk drive (HDD) or solid-state drive (SSD), a computer managing and providing access to multiple storage devices, a storage area network (SAN), a database, or a cloud storage system. A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130.

The data provided by the data sources 120 is typically organized into data records stored as data files, which each data record including one or more values. For example, a data record provided by a data source 120 may include a series of comma-separated values. The data describe information of relevance to an enterprise using the data analytics system 110. For example, data from a data source 120 can describe computer-based interactions (e.g., click tracking data) with content accessible on websites and/or with social media applications. As another example, data from a data source 120 can store unstructured or structured text data, such as text from a novel, and the like.

In one embodiment, a data file may include a series of characters (e.g., data records, text from an essay, etc.) that are encoded in memory using a series of code points according to an industry standard. A code point (or code-point or code position) defined herein is a numerical value that maps to a specific character based on a character encoding scheme. In one instance, a code point represents a single grapheme-a letter, digit, punctuation mark, or whitespace, but can also represent symbols, control characters, or formatting. The set of all possible code points within a given encoding or character set make up that encoding's codespace. As an example, the character encoding scheme ASCII comprises 128 code points in the range 0x00 to 0x7F, extended ASCII includes 256 code points in the range 0x00 to 0xFF, and Unicode includes 1,114,112 code points in the range 0x000000 to 0x10FFFF. Thus, the total size of the Unicode code space is 17×65,536=1,114,112. The code points of the data file are encoded using a variable-width encoding scheme as one or more encoded bytes in memory. In one primary embodiment referred throughout the remainder of the specification, the industry standard is Unicode that is a representation of characters or symbols used around the world and assigns a unique numerical value or code point to each character (e.g., U+0041 for uppercase letter "A"). In one embodiment, the variable-width encoding scheme is UTF-8 that encodes a particular code point using one, two, three, or four bytes.

Specifically, depending on the code point, UTF-8 encodes the corresponding character using one to four bytes. The lead byte of a sequence of bits encoded in UTF-8 includes specific bits set to indicate the number of bytes used for encoding the character. These bits are responsible for identifying whether the byte is the lead byte of a multi-byte sequence, a trailing byte of the multi-byte sequence, or a single-byte sequence.

(1) "0xxxxxxx" with "0" for the first indicator bit indicates the byte is a single-byte;

(2) "110xxxxx" with "110" for the first three indicator bits indicates the byte is a lead byte for a two-byte character;

(3) "1110xxxx" with "1110" for the first four indicator bits indicates the byte is a lead byte for a three-byte character;

(4) "11110xxx" with "11110" for the first five indicator bits indicates the byte is a lead byte for a four-byte character;

(5) "10xxxxxx" with "10" for the first two indicator bits indicates the byte is a trailing byte for a multi-byte character.

The corresponding character can be identified for an encoding by taking the "x" bits in the description above and mapping the value of the bits to the Unicode code point value. For example, the cent symbol "¢" has a Unicode code point of U+00A2 and is encoded as "11000010:10100010" in UTF-8 as a two-byte sequence. Extracting the bits from the two-byte sequence excluding the indicator bits results in "00010100010," which corresponds to 162 in decimal (A2 in hexadecimal) that is the Unicode code point for the symbol.

The data analytics system 110 is a computer-based system utilized for processing and analyzing large amounts of data. The data are collected, gathered, or otherwise accessed from the multiple data sources 120 via the network 130. The data analytics system 110 can implement scalable software tools and hardware resources employed in accessing, preparing, blending, and analyzing data from a wide variety of data sources. For instance, the data analytics system 110 supports the execution of data intensive processes and workflows. The data analytics system 110 can be a computing device used to implement the parsing and code skipping functions for variable-width encoding schemes as described herein.

The data analytics system 110 can be configured to support one or more software applications, illustrated in FIG. 1 as a data analytics application 140. The data analytics application 140 processes and analyzes large amounts of data obtained from one or more of the data sources 120. In some cases, the data analytics application 140 provides software that supports network, or cloud-based, access to data analytic tools and macros by multiple end users. As an example, the data analytics application 140 allows users to share, browse, and consume analytics in a manner similar to a mobile application store or other cloud-based service. Analytic data, macros, and workflows can be packaged and executed as a smaller scale and customizable analytic application (i.e., an app), for example, that can be accessed by other users of the data analytics system 110. In some cases, access to published analytic apps can be managed by the data analytics system 110, namely granting or revoking access, and thereby providing access control and security capabilities. The data analytics application 140 can perform functions associated with analytic apps such as creating, deploying, publishing, iterating, updating, and the like. Additionally, the data analytics application 140 can support functions performed at various stages involved in data analytics.

The data analytics application 140 can also support a software tool to design and execute repeatable workflows, via a visual graphical user interface (GUI). As an example, a GUI associated with the data analytics application 140 offers a drag-and-drop workflow environment for data blending, data processing, and advanced data analytics. Moreover, a workflow can include a series of data processing tools that perform specific processing operations or data analytics functions. Each tool that is part of a workflow performs a function related to data that is specific to the tool. As an example, a workflow can include tools implementing various data analytics functions including one or more of the following: input/output; preparation; join; predictive; spatial; investigation; and parse and transform operations. More details about workflow are described in conjunction with FIG. 4.

In one embodiment, the data analytics application 140 provides an environment for accessing a stored data file and skipping ahead a desired number of code points of the data file in memory. Specifically, it may be advantageous for users of the data analytics system 110 to skip ahead a certain number of code points and arrive at a desired location in memory (e.g., memory address) that corresponds to a destination code point in the data file. The destination code point comes after a reference code point (e.g., initial code point in the data file) by the desired number of code point skips. For example, a user may like to skip or ignore a certain number of characters (e.g., first 20 characters) to ensure data integrity and security. As another example, some characters may not be relevant to a text processing task and by skipping unnecessary code points, the user can streamline text processing processes to make them more computationally efficient.

Typically, the data analytics application 140 performs code point skipping for a desired number of code point skips from a reference location by sequentially processing individual code point skips in the data file. The code skipping process may sequentially load an individual byte to a register, identify how many trailing bytes would follow the loaded byte, and move the pointer ahead to the next expected lead byte of the data file. In one instance, multiple instructions may be performed to identify whether the byte is followed by 0, 1, 2, or 3 (and so on) trailing bytes. This process is repeated until the desired number of code skips are reached in the data file.

In particular, when the data analytics application 140 processes individual code point skips in a conventional manner, the data analytics application 140 initializes a counter indicating the number of code points skips remaining. The data analytics application 140 may also initialize a pointer pointing to a reference location in memory for the data file. The data analytics application 140 loads the bits of an individual byte of the data file (assumed to be a lead byte) to the register and identifies the indicator bits of the byte. In some instances, multiple instructions are performed to determine whether the byte includes "0," "110," "1110," or "11110" as the starting bits. Depending on the identified indicator bits, the data analytics application 140 determines the expected number of trailing bytes, if any, that would come after the lead byte. For example, if the indicator bits of the byte stored on the register is "1110," the data analytics application 140 would expect there to be two trailing bytes after the lead byte. As another example, if the indicator bits of the loaded byte on the register is "0," then the data analytics application 140 would expect there to be no trailing bytes after the byte.

The data analytics application 140 decrements the counter by one count and moves the pointer ahead by the number of expected trailing bytes, such that the pointer addresses the next expected lead byte in the data file. The data analytics application 140 repeats the process until the desired number code skips are reached. However, since this code skipping process addresses individual code points in a sequential manner, this process can take a significant amount of time and resources. Moreover, registers typically have the capacity to load bits for multiple bytes of data, and by looking at lead bytes individually, the remaining storage bits of the register are not used in an efficient manner.

In one embodiment, as described in more detail below, the data analytics application 140 performs an improved code skipping process by loading a chunk of memory that corresponds to bits of a multi-byte sequence to one or more registers and determining how many lead bytes are in the multi-byte sequence at a time. Therefore, different from skipping individual code points, the data analytics application 140 processes multiple bytes (e.g., 8 bytes) at a time to determine the total number of lead bytes in the chunk. In one instance, the multi-byte sequence includes a number of bytes that correspond to the number of bytes a register can store and manipulate in an operating system. For example, the multi-byte sequence may include chunks of 8 bytes for a 64-bit register system, 4 bytes for a 32-bit register system, or 16 bytes for a 128-bit register system. However, it is appreciated that in other embodiments, the multi-byte sequence may include chunks of any number of bytes depending on the capacity of the register. The code skipping process described herein is a technical improvement over prior methods of processing data analytics data to perform code skipping.

After the determination, the data analytics application 140 decrements the code skip count by the number of determined lead bytes in the chunk. The data analytics application 140 repeats the process for the next memory chunk in the data file until a determination is made that a number of code points to skip is equal to or less than a predetermined threshold. From this point, the data analytics application 140 may sequentially process the remaining code points individually until the pointer is moved to a location for a destination code point that comes after the reference code point by the desired number of code point skips.

Figure 2:
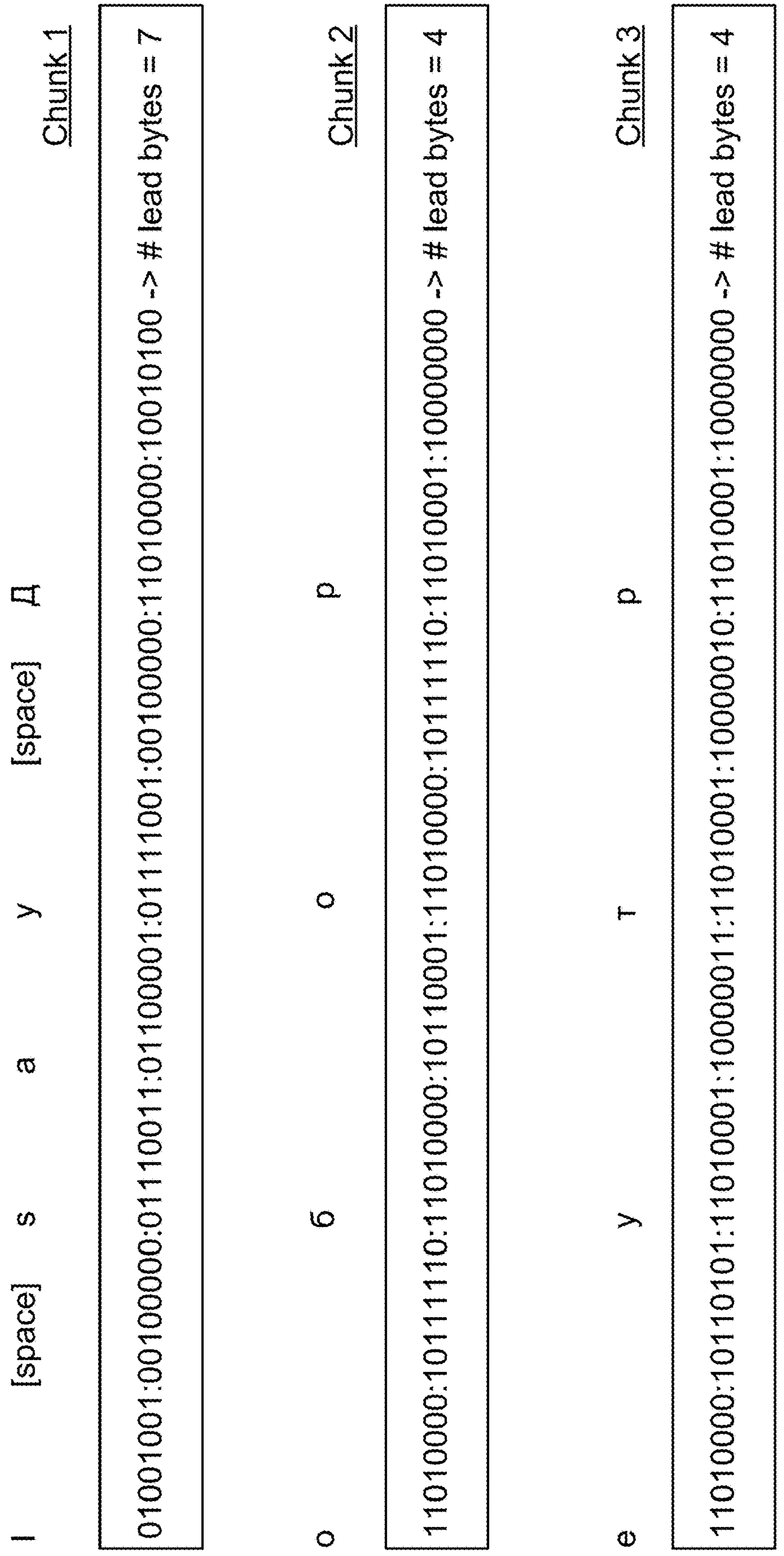
FIG. 2 is a diagram illustrating a portion of an example data file including a series of characters and the encoded representation in memory, according to one embodiment.

FIG. 2 is a diagram illustrating a portion of an example data file including a series of characters and the encoded representation in memory, according to one embodiment. The example data file illustrated in FIG. 2 includes at least the characters of:

"I say Доõoey Tp . . . "

Specifically, the characters in the illustrated portion of the data file are presented along with the UTF-8 encoding of each character, where each chunk in FIG. 2 corresponds to one or more characters or code points (in Unicode) spanning a memory chunk of 8 bytes, or 64 bits in memory. In the example code skipping process, the data analytics application 140 may receive a request to skip 19 code points starting from the start of the data file. The data analytics application 140 initializes a counter to 19 code point skips remaining.

Assuming a register can store 64 bits in the device, the data analytics application 140 initializes a pointer that points to the memory address for the starting character "I," encoded with one byte. The multi-byte chunk of 8 bytes ("Chunk 1"), which corresponds to the first 7 characters of the data file, is loaded on the register. While the register stores the bits of the memory chunk, the data analytics application 140 is not yet able to determine how many code points are encoded by "Chunk 1." One or more instructions are performed (as described in more detail below in conjunction with FIG. 5) on the bits of the multi-byte sequence to determine the number of lead bytes in the multi-byte sequence. For "Chunk 1" in FIG. 2, the number of determined lead bytes is 7. Therefore, the data analytics application 140 decrements the counter by 7 code points to 12 code point skips remaining. The pointer is moved to a location in memory that corresponds to the next multi-byte sequence, which is the start of "Chunk 2."

The data analytics application 140 repeats this process of loading the multi-byte sequence for "Chunk 2" to the register and determines that the number of lead bytes in "Chunk 2" is 4. The data analytics application 140 decrements the counter by 4 code points such that there are 8 code point skips remaining. The pointer is moved to a location in memory that corresponds to the next multi-byte sequence, which is the start of "Chunk 3." The data analytics application 140 determines the number of lead bytes in "Chunk 3" is 4. The data analytics application 140 then decrements the counter by 4 code points to 4 code point skips remaining.

In one embodiment, the data analytics application 140 may determine that a number of code points to skip is equal to or less than a predetermined threshold. Responsive to the determination, the data analytics application 140 sequentially processes the remaining code point skips individually. This is because if the number of code point skips remaining is relatively small, the next chunk of memory may include more lead bytes than the number remaining, so the remaining code point skips are processed one by one to decrement the counter with respect to individual code points. For example, in the illustration of FIG. 2, the data analytics application 140 may load the next byte immediately after "Chunk 3" to a register. If it is determined that the byte is a lead byte, the data analytics application 140 determines the number of trailing bytes. The data analytics application 140 decrements the counter by 1 and moves the pointer ahead to the starting byte of the next code point. This process is repeated until the count indicates no code point skips are remaining, and the pointer is moved to a location for a destination code point coming after the reference code point by the desired number of code point skips.

As described in more detail below in conjunction with FIGS. 3-4, the operations on a multi-byte sequence determine how many lead bytes are in the sequence. Specifically, the operations allow a determination of whether the first bit of a byte includes a 0 bit or whether the second bit of a byte includes a 1 bit, since a lead byte for UTF-8 encoding will satisfy these conditions. In this manner, the data analytics application 140 can determine the number of code points for a multi-byte sequence at a given point in time, rather than processing individual lead bytes. This leads to a faster and more efficient code skipping process. The improved code skipping process described herein may allow the data analytics application 140 to skip ahead a desired number of code points using fewer number of instructions on the registers compared to the process of iteratively determining the number of bytes for each individual code point.

The network 130 represents the communication pathways between the data analytics systems 110 and data sources 120. In one embodiment, the network 130 is the Internet and uses standard communications technologies and/or protocols. Thus, the network 130 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 3:
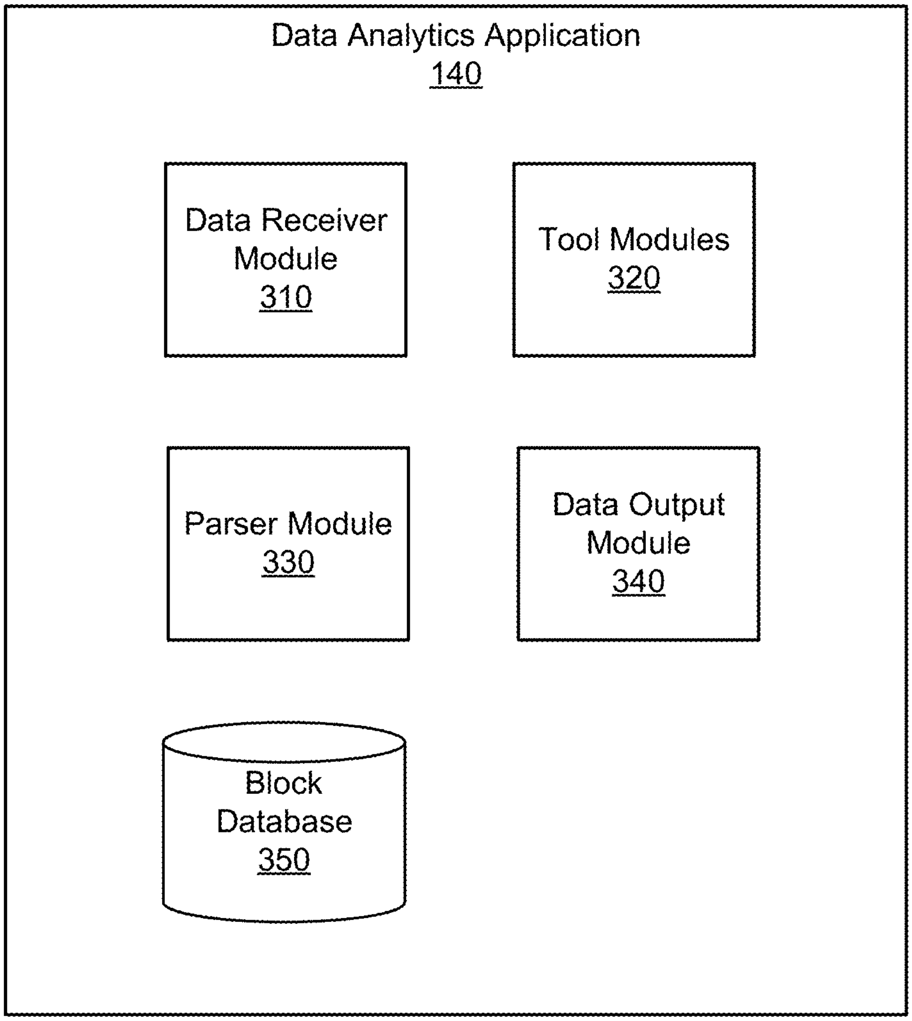
FIG. 3 is a block diagram illustrating a more detailed view of a data analytics application of the data analytics system, according to one embodiment.

FIG. 3 is a block diagram illustrating a more detailed view of the data analytics application 140 of the data analytics system 110 according to one embodiment. The data analytics application 140 includes a data receiver module 310, tool modules 320, a parser module 330, a data output module 340, and a block database 350. Those of skill in the art will recognize that other embodiments can have different and/or other components than the ones described here, and that the functionalities can be distributed among the components in a different manner.

The data receiver module 310 receives data from the data sources 120. In one embodiment, the data receiver module 310 receives data blocks from a data source and parses the data blocks to produce data records. For example, the data receiver module 310 may receive data blocks read from a data file on a SSD, where each data block includes multiple data records, and some data records may span multiple data blocks. The data receiver module 310 passes the data records to the other modules within the data analytics application 140.

The tool modules 320 provide a set of data processing tools that perform specific processing operations or data analytics functions including one or more of the following: input/output; preparation; join; predictive; spatial; investigation; and parse and transform operations. The tools operate on the data records received from the data sources 120 by the data receiver module 310. The operation on the data records can be asynchronous. The tool modules 320 provide the tools included in the workflow 400 described in conjunction with FIG. 4.

Figure 4:
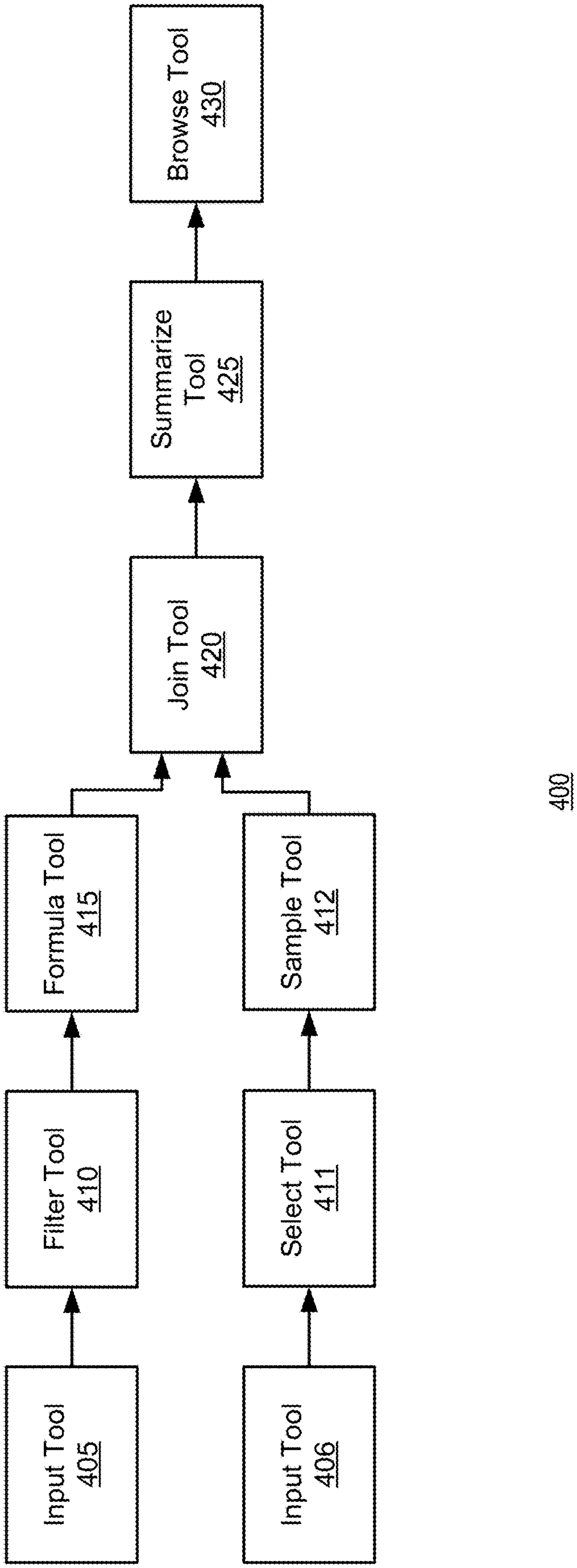
FIG. 4 block diagram illustrating a workflow created using the data analytics system to process data, according to one embodiment.

FIG. 4 is a block diagram illustrating a workflow 400 created using the data analytics system 110 to process data according to one embodiment. In one embodiment, the workflow 400 is created using a visual workflow environment supported by a GUI of the data analytics system 110. The visual workflow environment enables a set of drag and drop tools that eliminate the need for providing software code to design a workflow and eliminate the need to identify complex formulas to be implemented by the workflow. In another embodiment, the workflow 400 is created and described in a document, such as an extensible markup language (XML) document. The workflow 400 is executed by a computer device of the data analytics system 110. However, in other embodiments, the workflow 400 is deployed to another computer device that may be communicatively connected, via a network (e.g., network 130), to the data analytics system 110.

A workflow can include a series of tools that perform specific processing operations or data analytics functions. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. A packet including an aggregated group of individual data records can be passed through the tools of a workflow, which allows for the individual processing operations to operate more efficiently on the data. Such aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools execute in parallel.

As illustrated, the workflow 400 of FIG. 4 includes input/output tools, illustrated as input tools 405 and 406 and a browse tool 430. The input tools 405 and 406 function to access data records from particular data sources 120. The input tools 405 and 406 bring into the workflow the accessed data records and provide the data records to the subsequent tools of the workflow 400. In this example, the input tool 405 provides accessed data records to a filter tool 410 and the input tool 406 provides accessed data records to a select tool 411. The browse tool 430 is located at the end of the workflow 400 and receives the output resulting from the execution of each of the upstream tools of the workflow 400. Although the browse tool 430 is located at the end of the workflow 400 in this example, the browse tool 430 can be added at any point in a workflow to review and verify results from execution of upstream tools of the workflow.

In continuing with the example of FIG. 4, the workflow 400 includes preparation tools, shown as the filter tool 410, the select tool 411, a formula tool 415, and a sample tool 412. The filter tool 410 queries data records based on an expression and splits the data into two streams, a true stream that includes data records that satisfy the expression and a false stream that includes data records that do not satisfy the expression. The select tool 411 can be used to select, deselect, reorder and rename fields, change field type or size, and assign a description. The formula tool 415 creates or updates fields using one or more expressions to perform a broad variety of calculations and/or operations. The sample tool 412 limits a received stream of data records to a number, percentage, or random set of data records. The workflow 400 also includes a join tool 420 that blends multiple data sources. Specifically, the join tool 420 combines two input data streams based on common fields (or data record position).

The workflow 400 of FIG. 4 is also shown to include a summarize tool 425 which is a parse and transform tool that can restructure and re-shape data to a format used in further analysis. The summarize tool 425 can also perform summarization of data by grouping, summing, counting, spatial processing, and string concatenation. In one embodiment, the output generated by the summarize tool 425 contains the results of the calculation(s).

In some embodiments, execution of the workflow 400 will cause the input tool 405 to pass data records one at a time through the filter tool 410 and the formula tool 415, until all data records are processed and have reached the join tool 420. Thereafter, the input tool 406 will begin passing data records one at a time through the select tool 411 and sample tool 412, until the data records are passed to the same join tool 420. Some individual tools of the workflow 400 can possess the capability to implement their own parallel operation, such as initiating a read of a block of data while processing the last block of data or breaking computer-intensive operations, such as a sort tool, into multiple parts. However, in some existing workflow techniques, each data record from a set of data records is individually processed by each tool of the workflow one data record at a time, in a pipeline fashion, until a tool in the workflow is reached that requires multiple data records to perform the processing operation (e.g., sort tool, join tool, summarize tool, etc.)

The parser module 330 parses one or more data files or data sources stored in memory. In one embodiment, the parser module 330 performs the functionality of the code point skipping process described above in conjunction with FIG. 2 to process multi-byte sequences of the data file for one or more iterations. The parser module 330 processes one or more multi-byte memory chunks in sequence to determine the number of lead bytes in each chunk, and if necessary, processes the remaining code point skips individually until desired number of code point skips is reached.

In one embodiment, the parser module 330 initializes a pointer to point to a reference location in memory. For example, this may be a starting byte of the data file. The parser module 330 receives a request to skip a desired number of code points. For each iteration for one or more iterations, the chunk of memory for a current iteration is loaded onto a register. In one instance, the parser module 330 performs one or more instructions (as described in an example of FIG. 5) that allows the parser module 330 to determine the number of lead bytes in a multi-byte memory chunk. In one instance, one instruction copies the original sequence and performs a right shift operation by 1 bit to generate a shifted sequence. One instruction complements the bits of the shifted sequence to generate a complemented shifted sequence. One instruction performs an OR operation between the original sequence and the complemented shifted sequence. One instruction generates an output sequence by performing an AND operation between the sequence that is a result of the previous OR operation and a comparison sequence. In one instance the comparison sequence is the sequence 0x4040404040404040 in hexadecimal, such that as a result of the comparison, the output sequence indicates whether the second bit of each byte of the original sequence was a 1 or the first bit of each byte of the complemented shifted sequence is a 1 bit.

FIG. 5 is an example illustrating a method of processing a multi-byte chunk of the data file to determine a number of lead byes in the sequence, according to one embodiment. In particular, FIG. 5 illustrates determining the number of lead bytes in “Chunk 1” of FIG. 2 at a first iteration. As shown in FIG. 5, the register loads the original multi-byte sequence corresponding to code points “I,” “[space],” “s,” “a,” “i,” “d,” and “Д” in the data file. While the register stores the bits of the memory chunk, the data analytics application 140 is not yet able to determine how many code points are encoded by “Chunk 1” until certain instructions are performed on the bits. As shown in FIG. 5, character “I” is represented as encoding “01001001,” “[space]” is represented by encoding “00100000,” “s” is represented by encoding “01110011,” “a” is represented by encoding “01100001,” “i” is represented by encoding “01101001,” “d” is represented by encoding “01100100,” and the Cyrillic character “Д” is represented by the two-byte encoding “11010000:10010100.”

The parser module 330 instructs the original sequence to be copied to another register and a right shift operation of one bit to be performed to generate a shifted sequence. This operation is shown in FIG. 5 as “shift right by one.” The parser module 330 instructs the shifted sequence to complement the bits to generate a complemented shifted sequence. This operation is shown in FIG. 5 as “complement shift.” The data analytics application 140 instructs an OR operation to be performed between the original sequence and the complemented shifted sequence. This operation is shown in FIG. 5 as (“OR with original”). The parser module 330 instructs an AND operation to be performed between the sequence resulting from the OR operation and a comparison sequence to generate an output sequence. In one instance, the comparison sequence is 0x404040 . . . 40, which in hexadecimal form is represented by repeating bytes of "0x40," which is 01000000 in binary for a single byte. This operation is shown in FIG. 5 as "AND with 0x40."

The parser module 330 performs a count of the number of 1 bits in the output sequence. In the example of FIG. 5, the number of 1 bits is 7 bits, thus, indicating that there are 7 lead bytes in the multi-byte sequence. In one embodiment, the count instruction is performed by built-in functions or capabilities, such as population count (e.g., "POPCOUNT") instructions based on the type of instruction set architecture. In this manner, the parser module 330 can count the number of lead bytes, and therefore, the number of code points captured by the multi-byte sequence at a given iteration with a significantly fewer number of instructions.

These instructions on the multi-byte sequence determine whether any byte in the sequence is a lead byte. Specifically, the instructions allow a determination of whether the first bit of each byte of the original sequence is a 0 or whether the second bit of each byte of the sequence is a 1, since a lead byte for UTF-8 encoding satisfies either of these conditions. In contrast, if the first bit is a 1 bit and the second bit is a 0 bit, the byte is a trailing byte. In this manner, the resulting second bit of the final output sequence will be a 1 bit for bytes that are lead bytes, with the remaining bits being 0 bits, and the count will add up the number of 1 bits and thus, will count the number of lead bytes.

The parser module 330 decrements the counter by the number of lead bytes detected and moves the pointer to the location for the next memory chunk, and this process is repeated. In response to a determination that a number of code points to skip is equal to or less than a predetermined threshold, the parser module 330 processes one or more individual code points to move the pointer to a location for a destination code point that comes after the reference code point by the desired number of code point skips. For example, the parser module 330 may determine that if the counter is less than 8 code point skips left (e.g., 1, 2, 3, . . . , 7 bytes), than the instructions will process the subsequent code point skips individually, as the next multi-byte sequence may or may not include more than 3 lead bytes. In an alternate embodiment, the parser module 330 increments the pointer if after counting the current chunk, there are more than zero or more skips to go. Otherwise, the parser module 330 starts stepping by individual code points from the starting point of the current chunk.

In one instance, when the parser module 330 processes one or more individual bytes, and the next byte is a trailing byte, the parser module 330 ignores trailing bytes if the next processing point starts with one. Alternatively, when switching from processing a multi-byte chunk to processing individual bytes, the parser module 330 may determine for the pointer to skip over a number of trailing bytes (determined from previous lead byte), such that the individual byte processing is on lead bytes. In correct UTF-8 encoding, the number of skipped trailing bytes would be 1, 2, or 3 trailing bytes, since all UTF-8 encodings have at most 3 trailing bytes. Performing this process will enable individual byte processing to detect invalid UTF-8 encoding if the next byte starts on a trailing byte.

In one instance, if the parser module 330 determines the number of lead bytes in a multi-byte sequence is less than two bytes, the parser module 330 may generate an error message to the user that there is an error. Since a code point in UTF-8 has at most 4 bytes, if the multi-byte sequence has less than two lead bytes this means that the UTF-8 encoding is incorrect and there may be an error in the encoding.

In one embodiment, the parser module 330 is further configured to perform a check on whether a multi-byte sequence includes a NULL byte (0x00). Since text is often represented and stored in memory with the end of the text indicated with a NULL byte, the presence of a NULL byte in the multi-byte sequence when the pointer is not at the end of the data file may indicate there is an error in the encoded bytes in memory. Therefore, before or after the data analytics application 140 determines the number of lead bytes as described in conjunction with FIG. 5, one or more operations may be performed to detect whether there is a NULL byte in the chunk. In another embodiment, the parser module 330 can confirm whether the end of the text is reached based on the length of the text or the count of the bytes of the text. In such an embodiment, it would be a potential error to find a NULL byte in the text.

In one embodiment, to perform a NULL byte check the parser module 330 performs one or more instructions (as described in an example of FIG. 6) that allows the parser module 330 to determine whether there are any NULL bytes in a multi-byte memory chunk. In one instance, one instruction copies the original sequence and performs a right shift operation by 1 bit to generate a shifted sequence. One instruction performs an OR operation between the original sequence and the shifted sequence to generate an intermediate result in the register, which is called SeekNull. One instruction performs a right shift operation by 2 bits on the SeekNull chunk. One instruction performs an OR operation between the SeekNull chunk and the 2-bit shifted chunk. The resulting sequence is set as the new SeekNull chunk. One instruction performs a right shift operation by 4 bits on the SeekNull chunk. One instruction performs an OR operation between the seeknull chunk and the 4-bit shifted chunk. One instruction generates an output chunk by performing an AND operation between the chunk that is a result of the previous OR operation and a comparison sequence. In one instance the comparison sequence is the sequence 0x0101010101010101 in hexadecimal. If the resulting sequence of the AND operation is not equal to 0x0101010101010101, then one of the bytes of the input chunk was zero, NULL, and the parser module 330 can branch to any special handling needed for NULL bytes.

FIG. 6 is an example illustrating a method of processing a multi-byte chunk of the data file to determine the presence of NULL bytes in the chunk, according to one embodiment. In particular, FIG. 6 illustrates checking NULL bytes in "Chunk 1" of FIG. 2 at a first iteration. The parser module 330 instructs the original chunk to be copied to another register and a right shift operation of one bit to be performed to generate a shifted chunk. This operation is shown in FIG. 6 as "shift right by one." The parser module 330 instructs an OR operation to be performed between the original chunk and the shifted chunk to generate SeekNull. This operation is shown in FIG. 6 as ("OR=SeekNull"). The parser module 330 instructs a right shift operation of two bits to be performed on the SeekNull chunk. This operation is shown in FIG. 6 as ("shift right by two"). The parser module 330 instructs an OR operation to be performed between the SeekNssull chunk and the 2-bit shifted chunk, and the resulting sequence is set as the new SeekNull sequence. This operation is shown in FIG. 6 as ("OR=SeekNull").

The parser module 330 instructs a right shift operation of four bits to be performed on the SeekNull chunk. This operation is shown in FIG. 6 as ("shift right by four"). The parser module 330 instructs an OR operation to be performed between the seeknull chunk and the 4-bit shifted chunk, and the resulting chunk is set as the SeekNull chunk. This operation is shown in FIG. 6 as ("OR=SeekNull"). The parser module 330 instructs an AND operation to be performed between the chunk resulting from the OR operation and a comparison sequence to generate an output chunk. In one instance, the comparison sequence is 0x010101 . . . 01, which in hexadecimal form is represented by repeating bytes of "0x01," which is 00000001 in binary for a single byte. This operation is shown in FIG. 6 as "AND with 0x01."

If the output sequence is not equal to 0x0101010101010101, then this indicates that there is at least one NULL byte in the chunk, and the encoding is erroneous. If the output chunk is equal to the comparison sequence, this indicates no NULL bytes in the chunk. The operations shown in FIG. 6 allow the bits of each byte to be OR together, such that a NULL byte would result in the output chunk not being equal to the comparison sequence of 0x0101010101010101. Responsive to the determination that there was a NULL byte, the parser module 330 may stop the code skipping process and generate and display an error message to the user. Otherwise, the parser module 330 may proceed with the code skipping process. The check may be performed for each multi-byte sequence or some multi-byte sequences.

In some instances, when processing the next memory chunk, the end of the text (i.e., NULL byte) may be reached and the memory chunk loaded on the register may read past the end of the data file. While this could potentially be a problem if the end of the text is close to a region of memory the parser module 330 was not allowed to read, memory boundaries are typically aligned to an even larger multiple than 8-byte chunks. Therefore, any particular 8-byte chunk is all in or all out of valid memory. Thus, in one embodiment, even though the input chunk may potentially read past the end of the text, the contents of that memory are not used. Specifically, when the parser module 330 detects there is a NULL byte present in the input chunk, the parser module 330 processes the bytes individually (from the start of the input chunk) and cannot get a memory access trap.

In one embodiment, the parser module 330 may determine whether the pointer at the reference location corresponds to a memory address that is aligned or unaligned with the number of bytes that are loaded for each multi-byte sequence during the code skipping process. For example, a memory address that is aligned for a 64-bit register corresponding to 8 bytes is divisible by 8 (assuming each byte of the data file has a memory address), while a memory address is unaligned if the address is not divisible by 8. If multi-byte sequences are loaded starting from a reference point that is unaligned, it may take more cycles for the processor to retrieve the bytes to the registers.

Thus, in one embodiment, the parser module 330 performs an alignment process to process multi-byte sequences that have boundaries aligned with the number of bytes of the register. In one instance, when the reference location (e.g., starting location of the data file) is unaligned, the parser module 330 determines how many bytes are needed to reach the next 8-byte boundary. For example, if the reference location is a memory address of 0x123, the parser module 330 determines that 5 bytes are needed to reach the next boundary, 0x128, that is aligned. In such an instance, the parser module 330 loads the register with 8 trailing bytes. The parser module 330 overwrites the last number of bytes in the register with the number of bytes determined in the data file. For example, the last 5 bytes of the register are copied with the first 5 bytes of the data file.

The parser module 330 determines how many lead bytes are included in the sequence. The parser module 330 decrements the counter by the number of determined lead bytes. The parser module 330 loads the next memory chunk, which is now aligned, and repeats the process of determining the number of lead bytes in the multi-byte sequence, until the desired number of code point skips is reached. This allows the parser module 330 to load the bits of the multi-byte sequences with a lesser number of cycles by loading memory chunks that are aligned with the 8-byte boundary.

While the primary embodiment described throughout the specification is processing multi-byte chunks of data to move forward a desired number of code point skips, in one embodiment, the disclosure herein can also be used to determine how many total code points are in text (e.g., or other types of data) of a data file.

For each iteration for one or more iterations, a chunk of memory for a current iteration is loaded onto a register. One or more instructions (as described in an example of FIG. 5) allows the parser module 330 to determine the number of lead bytes in a multi-byte memory chunk. As described above in conjunction with FIG. 5, one instruction copies the original chunk and performs a right shift operation by 1 bit to generate a shifted chunk. One instruction complements the bits of the shifted chunk to generate a complemented shifted chunk. One instruction performs an OR operation between the original chunk and the complemented shifted chunk. One instruction generates an output chunk by performing an AND operation between the chunk that is a result of the previous OR operation and a comparison sequence. In one instance the comparison sequence is 0x4040404040404040 in hexadecimal, such that as a result of the comparison, the output chunk indicates whether the second bit of each byte of the original chunk was a 1 or the first bit of each byte of the complemented shifted sequence is a 1 bit.

The parser module 330 iteratively loads multi-byte chunks and can keep a counter of the lead bytes counted for each chunk, as described in conjunction with FIG. 5. The counter can be incremented with the number of lead bytes detected for each memory chunk in an iterative manner. At each iteration, the parser module 330 may determine whether there are NULL bytes in the chunk, as described in conjunction with FIG. 6.

In one instance, when the end of the data file is marked with a NULL byte, the detection of a NULL byte in an input chunk indicates that the end of the text file has been reached. For the input chunk, the parser module 330 may process the bytes individually (e.g., starting from the beginning of the input chunk) and count the code points individually until the NULL byte is reached to obtain a total count of code points for the file. In another instance, an end of the data file may be known by a total number of bytes that store the contents of the data file. In such an instance, a second counter may keep the number of bytes that have been processed so far. The total number of code points that are recorded on the counter when the second counter matches the expected number of bytes for the data file is determined as the total number of code points for the data file.

Moreover, while the illustrations describe the code point skipping method using a primary example of a 64-bit register, it is appreciated that the method can be extended to registers with different capacities, for example, 128-bit registers, 32-bit registers, and the like. For example, the multi-byte sequence can include 16 bytes (for 128-bit register), and the operations described in conjunction with FIGS. 5-6 may be applied to a longer sequence of bits. In addition, multiple registers can be combined to increase the level of parallel computing. For example, two registers may be used to load two (or more) multi-byte sequences (e.g., two 64-bit registers to load a 128-bit sequence) from the data file at each iteration, and with additional registers, the data analytics application 140 may determine the number of lead bytes in both memory chunks.

Figure 7:
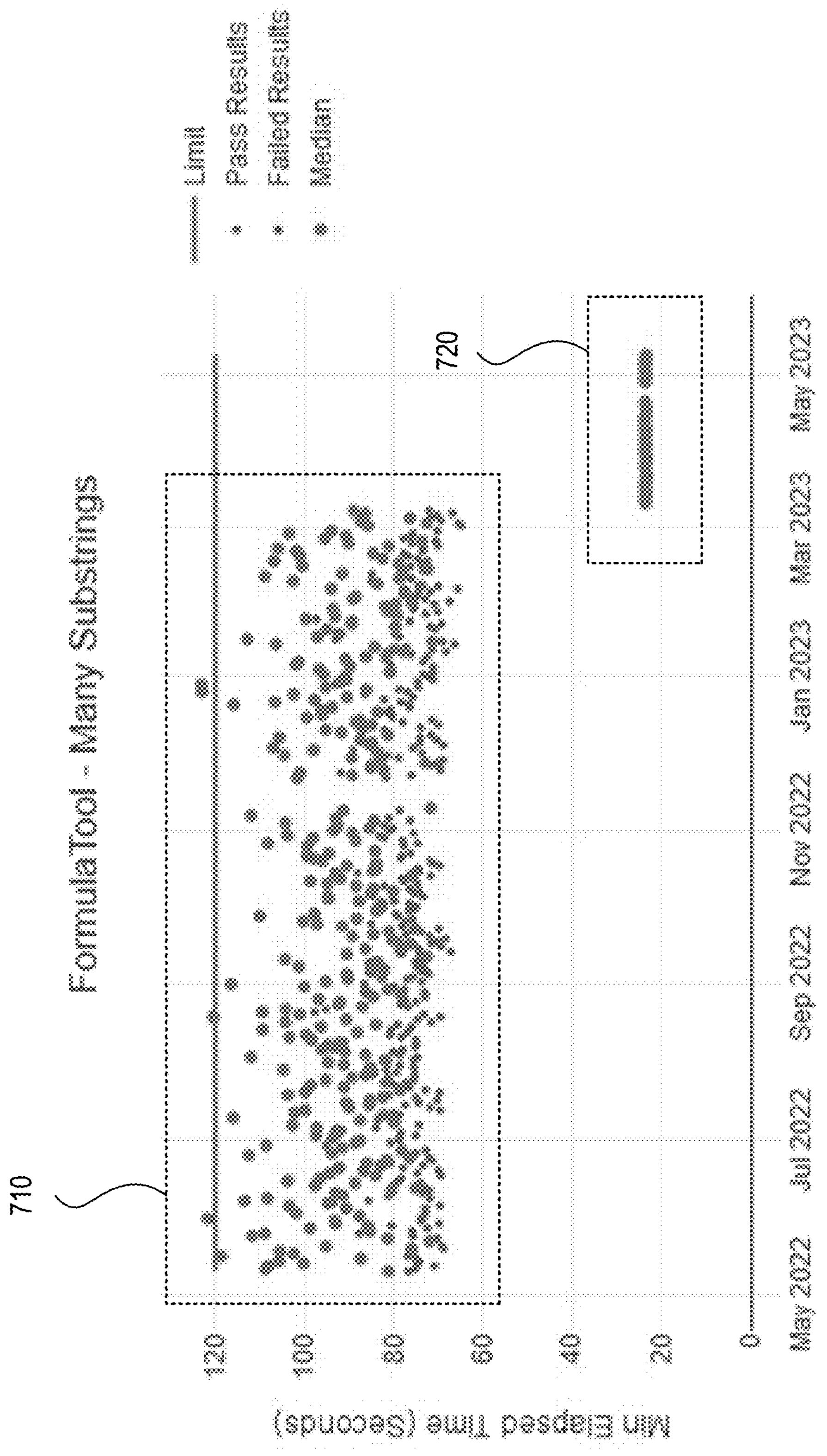
FIG. 7 illustrates test samples of performing code skipping by processing individual code point skips compared to code skipping using multi-byte sequences, according to one embodiment.

FIG. 7 illustrates test samples of performing code skipping by processing individual code point skips compared to code skipping using multi-byte sequences, according to one embodiment. In the example of FIG. 7, at each day, code skipping is performed three samples on a data file including text of a "Tale of Two Cities" by Charles Dickens. For each sample, the time in seconds for skipping 32 code points from character 1 to 32, from character 2 to 33, from character 3 to 34, and so on, is sampled. In particular, the median (in large circles) and the minimum (in small circles) times for each sample are plotted in FIG. 7, where the samples within the box labeled 710 are using a code point skipping method that processes code point skips individually, and the samples within the box 720 are using a code point skipping method described in conjunction with FIG. 5 that processes code point skips in parallel via multi-byte sequences. As shown in FIG. 7, the samples in 710 range from 60-120 seconds for the task, while the samples within the box 720 (using the improved code point skipping method described herein) range from 20-25 seconds for the same task, resulting in a significant improvement in time and computing resources.

Returning to FIG. 3, the data output module 340 outputs the results of the processing performed by the data analytics application 140. That is, the data output module 340 receives the processed data records produced by execution of the workflow 400 and makes the data records available to other systems and/or human reviewers. For example, the data output module 340 may provide a GUI by which a human reviewer associated with an enterprise can review the output of the workflow 400 resulting from processing data records associated with the enterprise.

Figure 8:
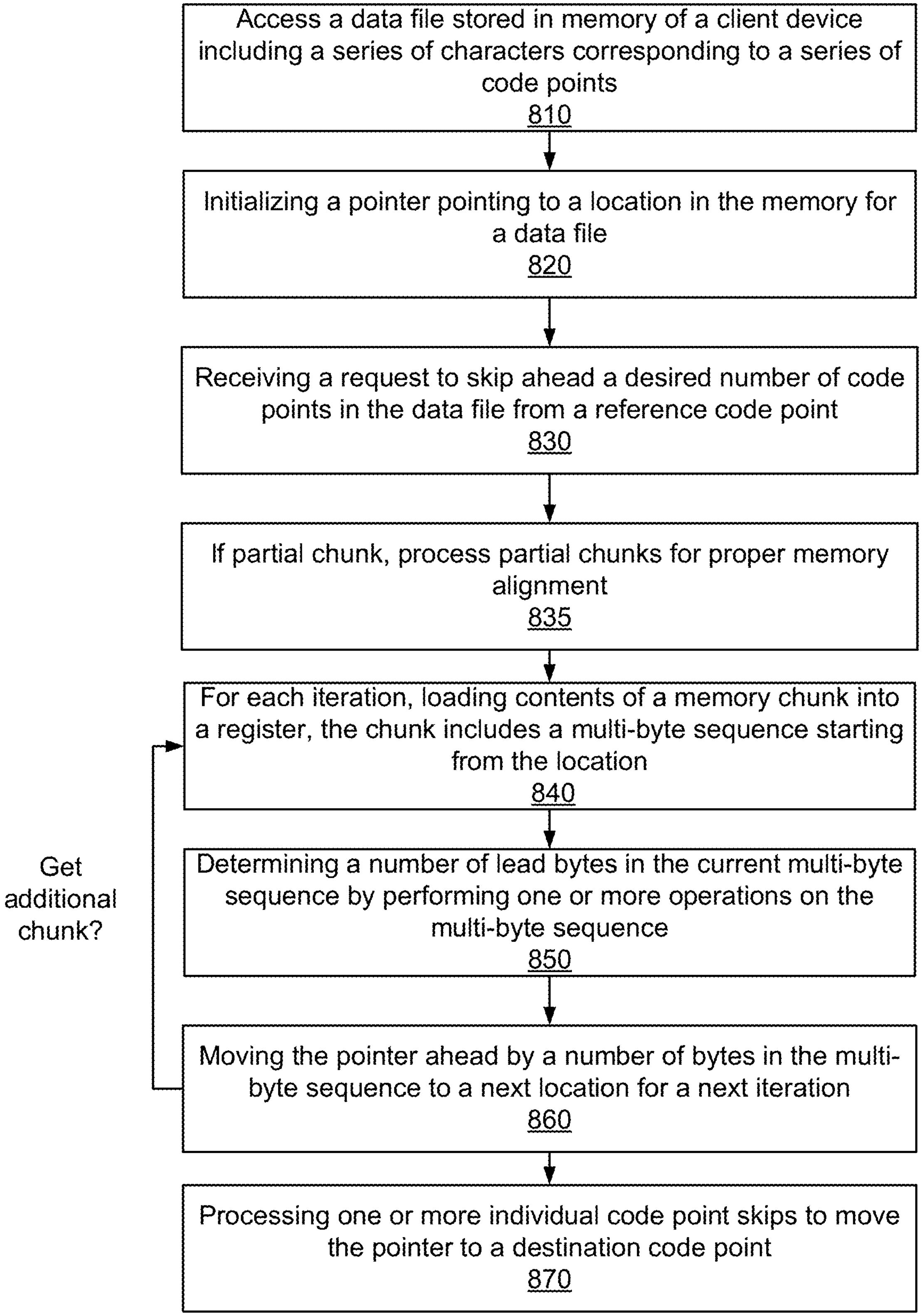
FIG. 8 is a flow chart illustrating a method of skipping ahead code points for variable-width encoding, according to one embodiment.

FIG. 8 is a flow chart illustrating a method of error handling during asynchronous processing of sequential data blocks according to one embodiment. In some embodiments, the method is performed by the data analytics application 140, although some or all of the operations in the method may be performed by other entities in other embodiments. In some embodiments, the operations in the flow chart are performed in different orders and include different and/or additional steps.

The data analytics application 140 accesses 810 a data file stored in memory of a computing device. The data file includes a series of characters corresponding to a series of code points, and the code points of the data file are encoded in memory using a variable-width encoding scheme. A code point may correspond to one or more encoded bytes in memory. The data analytics application 140 initializes 820 a pointer pointing to a location in the memory for the data file. The data analytics application 140 receives 830 a request to skip ahead a desired number of code points in the data file from a reference code point.

If there is a partial chunk, the data analytics application 140 processes 835 partial chunks in order to get chunks with proper memory alignment. For example, if the address of the text that is being addressed ends in a "3," the data analytics application 140 may first process 5 bytes of text, padded with nonsense or dummy "trailing" bytes. After processing that chunk, the pointer may be moved ahead by 5 bytes, such that subsequent chunks are aligned to a multiple of 8-byte addresses. For each iteration in one or more iterations, for a current iteration, the data analytics application 140 loads 840 contents of a chunk of memory into a register. The chunk includes a multi-byte sequence in memory starting from the location of the pointer. The data analytics application 140 determines 850 a number of lead bytes in the current multi-byte sequence by performing one or more operations on the current multi-byte sequence. The data analytics application 140 moves 860 the pointer ahead by a number of bytes in the multi-byte sequence to a next location that is a location for a next iteration.

In response to a determination that a number of code points to skip is equal to or less than a predetermined threshold, the data analytics application 140 processes 870 one or more individual code point skips to move the pointer to a location for a destination code point that comes after the reference code point by the desired number of code point skips.

Figure 9:
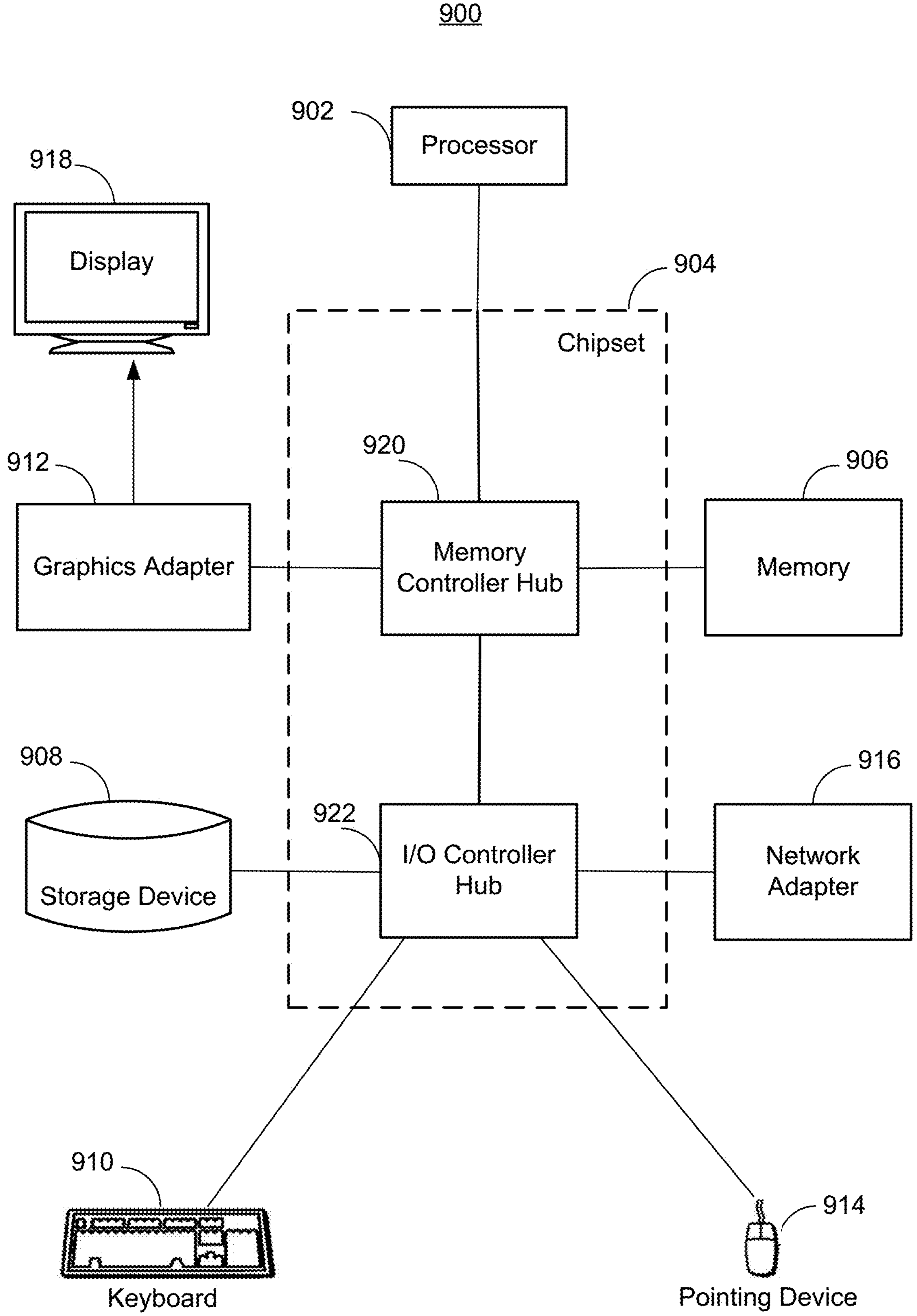
FIG. 9 is a high-level block diagram illustrating a functional view of a typical computer system for use as a data analytics system according to an embodiment.

FIG. 9 is a high-level block diagram illustrating a functional view of a typical computer system 900 for use as the data analytics system 110 of FIG. 1 according to an embodiment. The computer system 900 can execute the data analytics application 140 to implement the workflow of FIG. 4 or perform the code point skipping process of FIG. 5 or the NULL byte checks of FIG. 6, for example.

The illustrated computer system includes at least one processor 902 coupled to a chipset 904. The processor 902 can include multiple processor cores on the same die. The chipset 904 includes a memory controller hub 920 and an input/output (I/O) controller hub 922. A memory 906 and a graphics adapter 912 are coupled to the memory controller hub 920 and a display 918 is coupled to the graphics adapter 912. A storage device 908, keyboard 910, pointing device 914, and network adapter 916 may be coupled to the I/O controller hub 922. In some other embodiments, the computer system 900 may have additional, fewer, or different components and the components may be coupled differently. For example, embodiments of the computer system 900 may lack displays and/or keyboards. In addition, the computer system 900 may be instantiated as a rack-mounted blade server or as a cloud server instance in some embodiments.

The memory 906 holds instructions and data used by the processor 902. In some embodiments, the memory 906 is a random-access memory. The storage device 908 is a non-transitory computer-readable storage medium. The storage device 908 can be a HDD, SSD, or other types of non-transitory computer-readable storage medium. Data processed and analyzed by the data analytics system 110 can be stored in the memory 906 and/or the storage device 908.

The pointing device 914 may be a mouse, track ball, or other type of pointing device, and is used in combination with the keyboard 910 to input data into the computer system 900. The graphics adapter 912 displays images and other information on the display 918. In some embodiments, the display 918 includes a touch screen capability for receiving user input and selections. The network adapter 916 couples the computer system 900 to the network 170.

The computer system 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

I claim:

1. A method, comprising:

accessing a data file stored in memory of a computing device, the data file including a series of characters corresponding to a series of code points, each code point in the series of code points being encoded in memory using a variable-width encoding scheme, and each code point in the series of code points corresponding to one or more encoded bytes in memory;

receiving a request to skip ahead a desired number of code points in the data file from a reference code point in the series of code points;

initializing a counter indicating the desired number of code points to be skipped;

initializing a pointer, the pointer pointing to a location in the memory corresponding to the reference code point;

performing, for each iteration in one or more iterations, until the counter satisfies a threshold value:

loading a multi-byte chunk of data in the memory, starting from the location of the pointer, into at least one register;

determining a number of lead bytes in the multi-byte chunk by performing one or more operations on the multi-byte chunk; and decrementing the counter using the number of lead bytes and advancing the pointer to a different location in the memory based on a number of bytes in the multi-byte chunk;

responsive to the counter satisfying the threshold value, individually processing at least one code point in the series of code points to advance the pointer until the counter satisfies a minimum value; and responsive to the counter satisfying the minimum value, outputting data corresponding to a destination code point in the series of code points, the destination code point being identified by a current position of the pointer.

2. The method of claim 1, wherein determining the number of lead bytes in the multi-byte chunk comprises:

generating a complemented shifted chunk by performing a right shift operation to the multi-byte chunk;

performing an OR operation using the multi-byte chunk and the complemented shifted chunk;

generating an output sequence by performing an AND operation using a result of the OR operation and a comparison sequence; and counting a number of 1-bits in the output sequence and setting the number of 1-bits as the number of lead bytes for the multi-byte chunk.

3. The method of claim 2, wherein the comparison sequence is a repeated sequence of 0x40.

4. The method of claim 1, wherein processing the at least one code point in the series of code points comprises:

identifying a byte based on a location of the pointer;

loading the byte into the at least one register;

in response to determining that the byte is a lead byte, determining a number of trailing bytes following the byte; and moving the pointer based on the number of trailing bytes.

5. The method of claim 1, further comprising determining whether the multi-byte chunk includes a NULL byte before determining the number of lead bytes in the multi-byte chunk.

6. The method of claim 5, wherein determining whether the multi-byte chunk includes a NULL byte comprises:

generating a first shifted sequence by performing a right shift operation of one bit to the multi-byte chunk;

generating a first resulting chunk by performing an OR operation using the multi-byte chunk and the first shifted sequence;

designating the first resulting chunk as the multi-byte chunk;

generating a second shifted chunk by performing a right shift operation of two bits to the multi-byte chunk;

generating a second resulting chunk by performing an OR operation using the multi-byte chunk and the second shifted chunk;

designating the second resulting chunk as the multi-byte chunk;

generating a third shifted chunk by performing a right shift operation of four bits to the multi-byte chunk;

generating a third resulting chunk by performing an OR operation using the multi-byte chunk and the third shifted chunk;

designating the third resulting chunk as the multi-byte chunk;

performing an AND operation using the multi-byte chunk and a comparison sequence;

determining that a NULL byte is included in the multi-byte chunk based on the AND operation; and providing an indication to the computing device indicating an error in the data file.

7. The method of claim 1, wherein the variable-width encoding scheme is UTF-8 and the at least one register comprises at least one of a 32-bit register, a 64-bit register, or a 128-bit register.

8. The method of claim 1, further comprising:

determining that a memory address of the reference code point is not aligned;

responsive to determining that the memory address of the reference code point is not aligned, identifying a number of bytes in the data file until a next chunk of the data file is memory aligned;

loading an initial chunk of memory including one or more padded bytes and the number of bytes to a register; and moving the pointer to a location in memory that corresponds to the next chunk.

9. A non-transitory computer-readable medium storing instructions that are executable by at least one processing device to perform operations comprising:

accessing a data file stored in memory of a computing device, the data file including a series of characters corresponding to a series of code points, each code point in the series of code points being encoded in memory using a variable-width encoding scheme, and each code point in the series of code points corresponding to one or more encoded bytes in memory;

receiving a request to skip ahead a desired number of code points in the data file from a reference code point in the series of code points;

initializing a counter indicating the desired number of code points to be skipped;

initializing a pointer, the pointer pointing to a location in the memory corresponding to the reference code point;

performing, for each iteration in one or more iterations, until the counter satisfies a threshold value:

loading a multi-byte chunk of data in the memory, starting from the location of the pointer, into at least one register;

determining a number of lead bytes in the multi-byte chunk by performing one or more operations on the multi-byte chunk; and decrementing the counter using the number of lead bytes and advancing the pointer to a different location in the memory based on a number of bytes in the multi-byte chunk;

responsive to the counter satisfying the threshold value, individually processing at least one code point in the series of code points to advance the pointer until the counter satisfies a minimum value; and responsive to the counter satisfying the minimum value, outputting data corresponding to a destination code point in the series of code points, the destination code point being identified by a current position of the pointer.

10. The non-transitory computer-readable medium of claim 9, wherein determining the number of lead bytes in the multi-byte chunk comprises:

generating a complemented shifted chunk by performing a right shift operation to the multi-byte chunk;

performing an OR operation using the multi-byte chunk and the complemented shifted chunk;

generating an output sequence by performing an AND operation using a result of the OR operation and a comparison sequence; and counting a number of 1-bits in the output sequence and setting the number of 1-bits as the number of lead bytes for the multi-byte chunk.

11. The non-transitory computer-readable medium of claim 10, wherein the comparison sequence is a repeated sequence of 0x40.

12. The non-transitory computer-readable medium of claim 9, wherein processing the at least one code point in the series of code points comprises:

identifying a byte based on a location of the pointer;

loading the byte into the at least one register;

in response to determining that the byte is a lead byte, determining a number of trailing bytes following the byte; and moving the pointer based on the number of trailing bytes.

13. The non-transitory computer-readable medium of claim 9, the operations further comprising determining whether the multi-byte chunk includes a NULL byte before determining the number of lead bytes in the multi-byte chunk.

14. The non-transitory computer-readable medium of claim 13, wherein determining whether the multi-byte chunk includes a NULL byte comprises:

generating a first shifted sequence by performing a right shift operation of one bit to the multi-byte chunk;

generating a first resulting chunk by performing an OR operation using the multi-byte chunk and the first shifted sequence;

designating the first resulting chunk as the multi-byte chunk;

generating a second shifted chunk by performing a right shift operation of two bits to the multi-byte chunk;

generating a second resulting chunk by performing an OR operation using the multi-byte chunk and the second shifted chunk;

designating the second resulting chunk as the multi-byte chunk;

generating a third shifted chunk by performing a right shift operation of four bits to the multi-byte chunk;

generating a third resulting chunk by performing an OR operation using the multi-byte chunk and the third shifted chunk;

designating the third resulting chunk as the multi-byte chunk;

performing an AND operation using the multi-byte chunk and a comparison sequence;

determining that a NULL byte is included in the multi-byte chunk based on the AND operation; and providing an indication to the computing device indicating an error in the data file.

15. The non-transitory computer-readable medium of claim 9, wherein the variable-width encoding scheme is UTF-8 and the at least one register comprises at least one of a 32-bit register, a 64-bit register, or a 128-bit register.

16. The non-transitory computer-readable medium of claim 9, the operations further comprising:

determining that a memory address of the reference code point is not aligned;

responsive to determining that the memory address of the reference code point is not aligned, identifying a number of bytes in the data file until a next chunk of the data file is memory aligned;

loading an initial chunk of memory including one or more padded bytes and the number of bytes to a register; and moving the pointer to a location in memory that corresponds to the next chunk.

17. A system comprising:

one or more processors; and a computer-readable storage medium storing instructions that are executable by the one or more processors to perform operations comprising:

accessing a data file stored in memory of a computing device, the data file including a series of characters corresponding to a series of code points, each code point in the series of code points being encoded in memory using a variable-width encoding scheme, and each code point in the series of code points corresponding to one or more encoded bytes in memory;

receiving a request to skip ahead a desired number of code points in the data file from a reference code point in the series of code points;

initializing a counter indicating the desired number of code points to be skipped;

initializing a pointer, the pointer pointing to a location in the memory corresponding to the reference code point;

performing, for each iteration in one or more iterations, until the counter satisfies a threshold value:

loading a multi-byte chunk of data in the memory, starting from the location of the pointer, into at least one register;

determining a number of lead bytes in the multi-byte chunk by performing one or more operations on the multi-byte chunk; and decrementing the counter using the number of lead bytes and advancing the pointer to a different location in the memory based on a number of bytes in the multi-byte chunk;

responsive to the counter satisfying the threshold value, individually processing at least one code point in the series of code points to advance the pointer until the counter satisfies a minimum value; and responsive to the counter satisfying the minimum value, outputting data corresponding to a destination code point in the series of code points, the destination code point being identified by a current position of the pointer.

18. The system of claim 17, wherein determining the number of lead bytes in the multi-byte chunk comprises:

generating a complemented shifted chunk by performing a right shift operation to the multi-byte chunk;

performing an OR operation using the multi-byte chunk and the complemented shifted chunk;

generating an output sequence by performing an AND operation using a result of the OR operation and a comparison sequence; and counting a number of 1-bits in the output sequence and setting the number of 1-bits as the number of lead bytes for the multi-byte chunk.

19. The system of claim 17, wherein processing the at least one code point in the series of code points comprises:

identifying a byte based on a location of the pointer;

loading the byte into the at least one register;

in response to determining that the byte is a lead byte, determining a number of trailing bytes following the byte; and moving the pointer based on the number of trailing bytes.

20. The system of claim 17, the operations further comprising determining whether the multi-byte chunk includes a NULL byte before determining the number of lead bytes in the multi-byte chunk by:

generating a first shifted sequence by performing a right shift operation of one bit to the multi-byte chunk;

generating a first resulting chunk by performing an OR operation using the multi-byte chunk and the first shifted sequence;

designating the first resulting chunk as the multi-byte chunk;

generating a second shifted chunk by performing a right shift operation of two bits to the multi-byte chunk;

generating a second resulting chunk by performing an OR operation using the multi-byte chunk and the second shifted chunk;

designating the second resulting chunk as the multi-byte chunk;

generating a third shifted chunk by performing a right shift operation of four bits to the multi-byte chunk;

generating a third resulting chunk by performing an OR operation using the multi-byte chunk and the third shifted chunk;

designating the third resulting chunk as the multi-byte chunk;

performing an AND operation using the multi-byte chunk and a comparison sequence;

determining that a NULL byte is included in the multi-byte chunk based on the AND operation; and providing an indication to the computing device indicating an error in the data file.

* * * * *